United States Patent
Fox et al.

(10) Patent No.: US 6,778,174 B1
(45) Date of Patent: Aug. 17, 2004

(54) METHOD AND APPARATUS FOR ATTRIBUTE PROCESSING WITH AN ACTIVE PIPELINE STAGE IN A DATA PROCESSING SYSTEM

(75) Inventors: Thomas Winters Fox, Georgetown, TX (US); Javier A. Rodriguez, Austin, TX (US); Mark Ernest Van Nostrand, Cedar Park, TX (US); Jeffrey Allan Whaley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,539

(22) Filed: May 4, 2000

(51) Int. Cl.[7] .............................................. G06T 1/20
(52) U.S. Cl. ....................................... 345/506; 345/556
(58) Field of Search ................................ 345/506, 556; 712/225

(56) References Cited

U.S. PATENT DOCUMENTS

| | | | | |
|---|---|---|---|---|
| 5,129,059 A | * | 7/1992 | Hannah ....................... 395/166 |
| 5,434,967 A | * | 7/1995 | Tannenbaum et al. ...... 395/163 |
| 5,485,559 A | * | 1/1996 | Sakaibara et al. .......... 395/133 |
| 6,115,803 A | * | 9/2000 | Hayashi et al. ............... 712/25 |
| 6,222,550 B1 | * | 4/2001 | Rosman et al. ............. 345/419 |
| 6,268,874 B1 | * | 7/2001 | Niu et al. .................... 345/506 |
| 6,532,009 B1 | * | 3/2003 | Fox et al. .................... 345/419 |

OTHER PUBLICATIONS

The OpenGL Graphics System: A Specification (Version 1.2); Segal et al.; Mar. 23, 1998.

* cited by examiner

Primary Examiner—Mark Zimmerman
Assistant Examiner—Scott Wallace
(74) Attorney, Agent, or Firm—Duke W. Yee; Mark E. McBurney; Lisa L. B. Yociss (57) ABSTRACT

A method and apparatus in a data processing system for processing graphics data in a processing element. A command is received. A determination is then made as to whether the command affects processing of current graphics data within the processing element. The command is sent to a subsequent processing element if the processing element is unaffected by the command. The command is held without affecting the processing element if the command affects processing of the current graphics data within the processing element until processing of the current graphics data has completed.

13 Claims, 6 Drawing Sheets

METHOD AND APPARATUS FOR ATTRIBUTE PROCESSING WITH AN ACTIVE PIPELINE STAGE IN A DATA PROCESSING SYSTEM

BACKGROUND OF THE INVENTION

1. Technical Field

The present invention relates generally to an improved data processing system and in particular to an improved method and apparatus for processing graphics data in a data processing system. Still more particularly, the present invention provides a method and apparatus for processing attributes in a data processing system.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. An attribute is used to define how a primitive will be displayed. Attributes include, for example, line style, color, and surface texture. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

With the large amounts of data and computations involved in processing graphics data, especially with three-dimensional applications, many of these computations have been offloaded from the central processing units to a graphics adapter. Within these graphics systems, a graphics pipeline located in the graphics adapter is used to process this graphics data. With a pipeline, the graphics data processing is partitioned into stages of processing elements in which processing data may be executed sequentially by separate processing elements.

Each functional stage or processing element of the pipeline processes attribute commands to update state information and vertex streams based on the current state of a particular stage or processing element. To maximize the vertex throughput in the pipeline, it is often necessary to have a capability of processing more than one vertex at a time in the pipeline. In this case, new vertices are accepted into the pipeline while others are in the midst of being processed in the pipeline. The pipeline processes each vertex in a serial fashion. In other words, a first vertex is passed from one stage to another stage down the pipeline. Other vertices are received after the first vertex and following the first vertex down the pipeline.

Problems occur when an attribute command is accepted or received at the pipeline while processing vertices. This attribute command can update the state of the stage receiving the attribute command. It is undesirable to change the state of the stage while existing vertices are being processed. The existing vertices being processed must be flushed through the stage before the attribute command can be processed. This system preserves the state of those vertices being processed when the state-altering attribute command is received. One effect of holding off processing of this type of attribute command is the latency associated with flushing vertices decreases performance in the pipeline. In cases such as immediate mode processing in which vertices and attributes can be interlaced one after the other, the performance penalty can be significant. This penalty includes sharp degradation in vertex throughput, as pipelining of vertices cannot be achieved and the vertex throughput becomes the vertex latency.

Therefore, it would be advantageous to have an improved method and apparatus for processing attribute commands in a manner in which performance in processing vertices is maximized.

SUMMARY OF THE INVENTION

The present invention provides a method and apparatus in a data processing system for processing graphics data in a processing element. A command is received. A determination is then made as to whether the command affects processing of current graphics data within the processing element. The command is sent to a subsequent processing element if the processing element is unaffected by the command. The command is held without affecting the processing element if the command affects processing of the current graphics data within the processing element until processing of the current graphics data has completed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
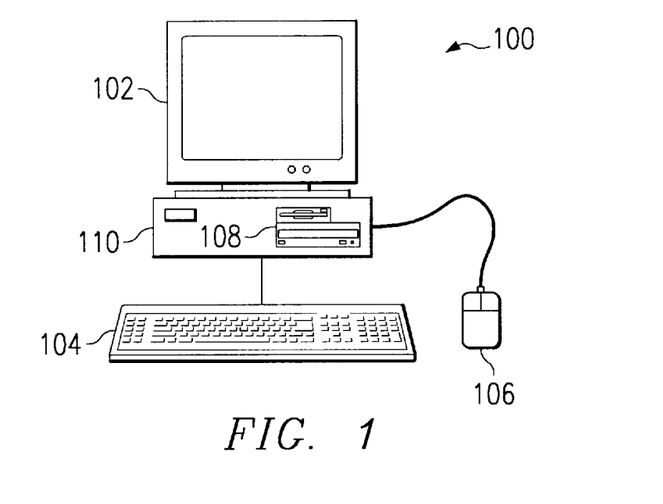
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
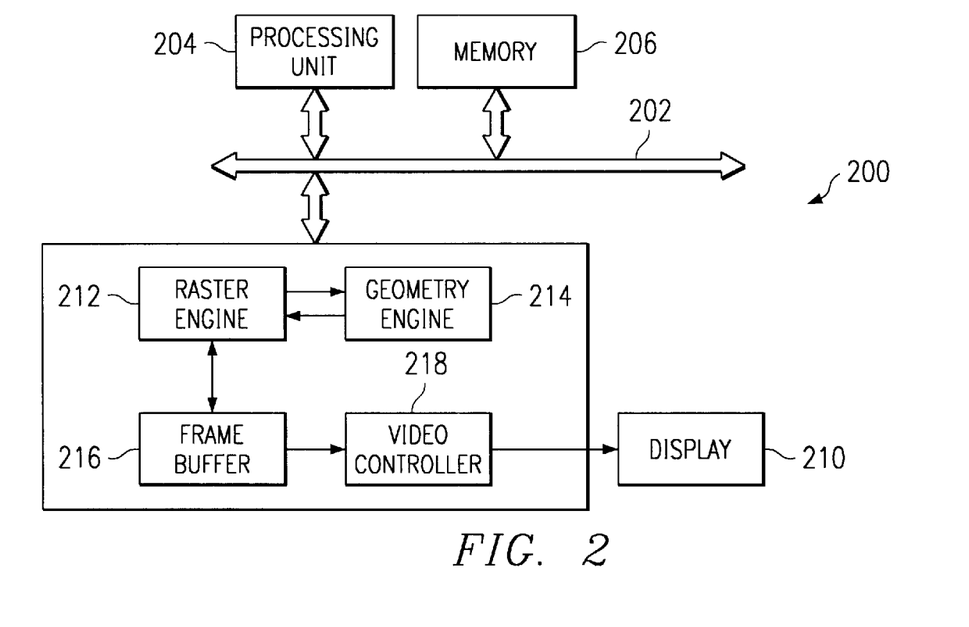
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1.

Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bitmap image while it is "painted" on a screen. Video controller 218 takes the data in frame buffer 216 and generates a display on display 210. Typically, video controller 218 will cycle through frame buffer 216 one scan line at a time.

Figure 3:
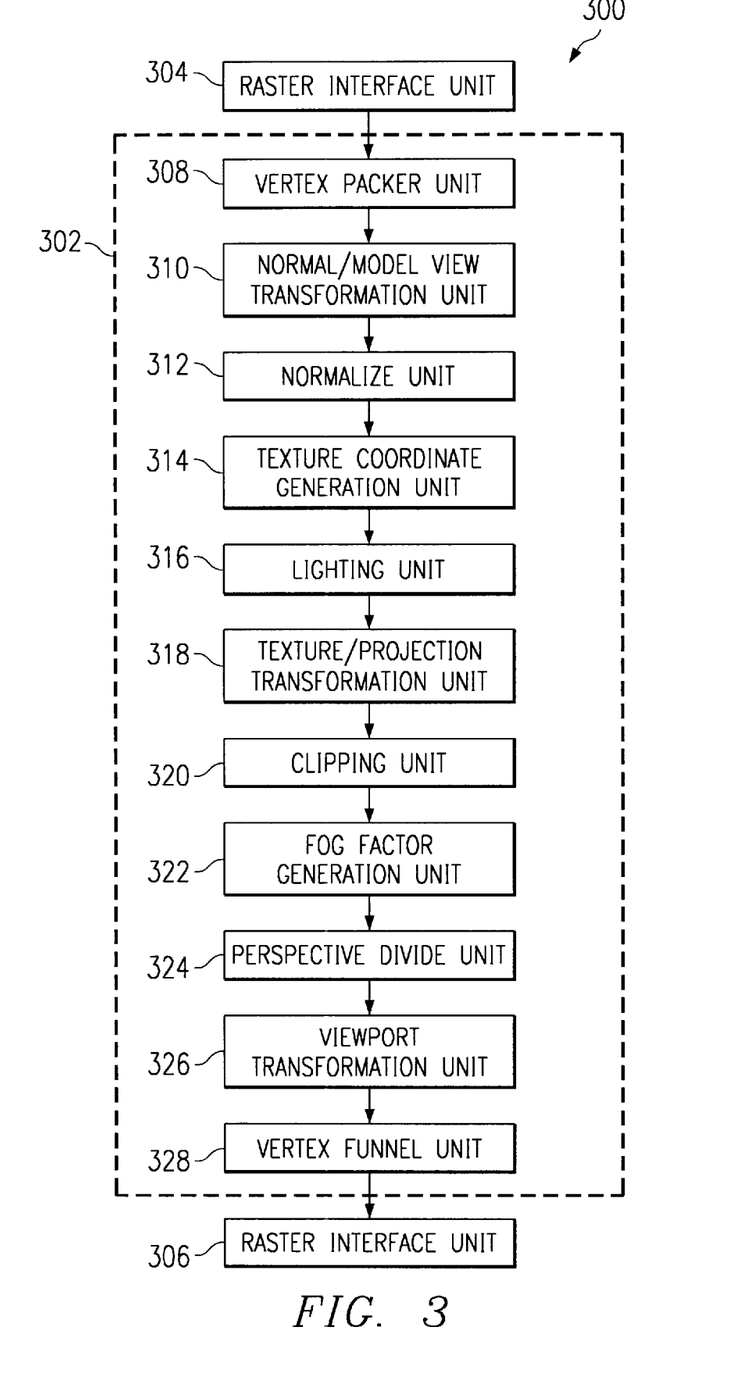
FIG. 3 is a block diagram of a geometry engine in accordance with a preferred embodiment of the present invention.

Turning now to FIG. 3, a block diagram of a geometry engine is depicted in accordance with a preferred embodiment of the present invention. Geometry engine 300, in this example, includes a geometry unit 302, a raster interface unit 304, and a raster interface unit 306. Data is received by raster interface unit 304 for processing within geometry unit 302. The data is received from a raster engine, such as raster engine 212 in FIG. 2. Processed data is returned to the raster engine using raster interface unit 306. The mechanism of the present invention is implemented within the processing elements in geometry unit 302.

Geometry unit 302, in this example, is a graphics pipeline containing a set of processing elements, which include a vertex packer unit 308, a normal/model view transformation unit 310, a normalize unit 312, a texture coordinate generation unit 314, a lighting unit 316, a texture/projection transformation unit 318, a clipping unit 320, a fog factor generation unit 322, a perspective divide unit 324, a viewport transformation unit 326, and a vertex funnel unit 328. These processing elements are also referred to as stages in geometry unit 302.

Vertex packer unit 308 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal model view transformation unit 310 is used to transform a normal vector from object space into eye space. The transformation is dependent on the model view transformation, which is an inverse transpose of the model view matrix. The model view transformation in normal/model view transformation unit 310 transforms object coordinates into eye coordinates by translating, scaling, and rotating objects.

Normalize unit 312 changes the normal vector to a vector of unit length, having a magnitude of 1.0, while preserving the direction of the original vector. Texture coordinate generation unit 314 generates texture coordinates used for displaying texture for a primitive. Texture coordinate generation unit 314 generates texture coordinates, such as object linear, eye linear, and spherical.

Lighting unit 316 computes shading and colors for each vertex. Specifically, lighting unit 316 generates the color of each vertex of an object based on the orientation of the object, the material properties of the object, the properties of the scene, and any defined light sources. Texture/projection transformation unit 318 transforms texture coordinates by translating, scaling, and rotating objects. Additionally, texture/projection transformation unit 318 transforms eye coordinates into clip coordinates, moving objects into a "viewing volume", by translating, scaling, and rotating objects. Typically this volume is a cube with extents of ±w that is orthogonal to the xyz coordinate system. Prospective projection makes an object further away appear smaller, while orthogonal projection does not make objects appear smaller when they are further away.

Clipping unit 320 clips objects to a viewing volume. Fog factor generation unit 322 is used to make an object fade into the distance (atmospheric effects) by making objects further away from the viewer less visible.

Perspective divide unit 324 is used to transform clip coordinates to normalized device coordinates [−1, +1] by dividing by the fourth coordinate w. Viewpoint transformation unit 326 is used to transform normalized device coordinates into screen or window coordinates. Device coordinates are coordinates used by the adapter to display images. Normalized device coordinates are device coordinates that are normalized to between 0 and 1.

Vertex funnel unit 328 takes fragments of vertices and places them on a bus for use by the raster interface unit. In this example, the fragments are funneled into a 64-bit data word for transfer on the bus. The stages illustrated in geometry unit 302 are based on operations specified in The OpenGL graphics. OpenGL is defined in The OpenGL Graphics System: A Specification (Version 1.2), which is available from Silicon Graphics, Inc. GraPHIGS is an implementation of Programmers Hierarchical Interactive Graphics System (PHIGS), which defines an application programming interface designed for two-dimenstional and three dimensional graphics applications using retained data structions. Of course, other types of graphics standards other than OpenGL and graPHIGS may be used in implementing the mechanism of the present invention.

The present invention provides a method and apparatus for selectively allowing attribute commands that do not affect the state of the stage to flow through that stage to other stages. Specifically, the mechanism of the present invention provides an ability to differentiate or identify attributes that are targeted or designated for a specific stage in a pipeline. By examining and identifying attributes that are for use in a particular stage, latency caused by flushing or letting all fragments for all vertices pass through a stage before processing additional vertices using received attributes is avoided. Attributes that are not designated for a stage do not affect that particular stage. These attributes are passed on and processing of fragments continue because these types of attributes do not affect that particular stage.

Figure 4:
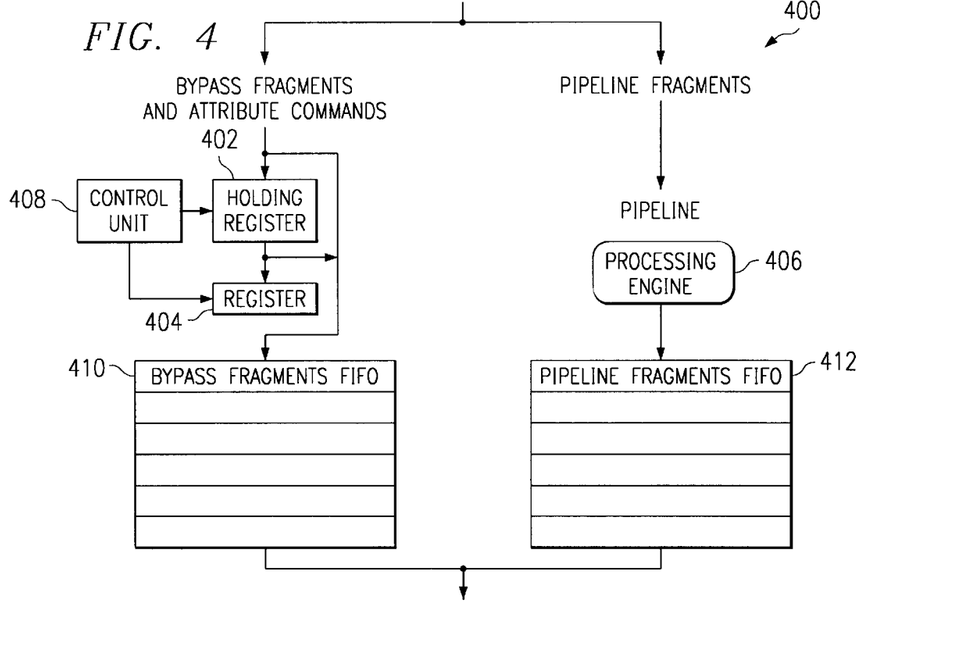
FIG. 4 is a block diagram illustrating components used in selective passing of attribute commands in accordance with a preferred embodiment of the present invention.

Turning now to FIG. 4, a block diagram illustrating components used in selective processing of attribute commands is depicted in accordance with a preferred embodiment of the present invention. The components in stage 400 are those involved in processing attributes using the mechanism of the present invention. Stage 400 in this example includes a holding register 402, a register 404, a processing engine 406, a control 408, a bypass fragments first-in-first-out(FIFO) Register 410, and a pipeline fragments FIFO 412.

Stage 400 receives vertices containing vertex fragments, which are also referred to as fragments. Vertex fragments are the smallest components of the vertex which cannot be subdivided within the pipeline. All of the fragments for a vertex are passed through the stages as a single group or unit. The fragments are only split when passing through a particular stage or processing element. When the fragment leaves a stage or processing element, it is grouped together with all of the other fragments forming the vertex.

Vertex fragments and attribute commands may be received and stored in bypass fragments FIFO 410. The attribute commands typically take the form of words. Fragments, which are identified as bypass fragments, are put into bypass FIFO 410 immediately when these fragments are received. Pipeline fragments processed by processing engine 406 are placed into pipeline fragments FIFO 412.

These fragments may be changed or generated by processing engine 406 for a vertex. The processing engine implements various functions, such as those described above in FIG. 3. For example, processing engine 406 may implement fog factor generation operations used in fog factor generation unit 322 in FIG. 3.

Pipeline FIFO 412 holds the same number of vertex fragments or fewer vertices than those held in bypass fragments FIFO 410. When processing engine 406 finishes processing a vertex and puts the results in pipeline fragments FIFO 412, those fragments along with the corresponding fragments for the vertex already located in bypass fragments FIFO 410 are ready to be transferred together as a complete vertex to the next stage in the pipeline.

Holding register 402 holds an incoming attribute command that affects the state of stage 400 until existing vertices received prior to the attribute command are flushed out of processing engine 406 in stage 400. The attribute is then moved out of holding register 402 and stored in register 404 for use by processing engine 406.

When an attribute command is placed into holding register 402, the stage becomes not ready to the previous stage in the pipeline. This state indicates that stage 400 is not ready to accept additional vertices for processing. If an attribute command received by stage 400 does not affect the state of stage 400, this attribute is place into bypass fragments FIFO 410. In this case, stage 400 remains ready to receive fragments and other data from a previous stage in the pipeline. This readiness state is indicated by a ready signal transmitted to the prior stage. The control of holding register 402, register 404, and identification of attribute commands is performed by control unit 408 in this example. Control unit 408 may take various forms, such as, for example, an application specific integrated circuit or a digital signal processor (DSP). Through this mechanism, latency problems associated with processing attribute commands are avoided when receiving attributes that do not affect a particular stage. The control of stages in the data flow through stage 400 using the mechanism of the present invention is described in more detail below in FIGS. 5 and 6.

Figure 5:
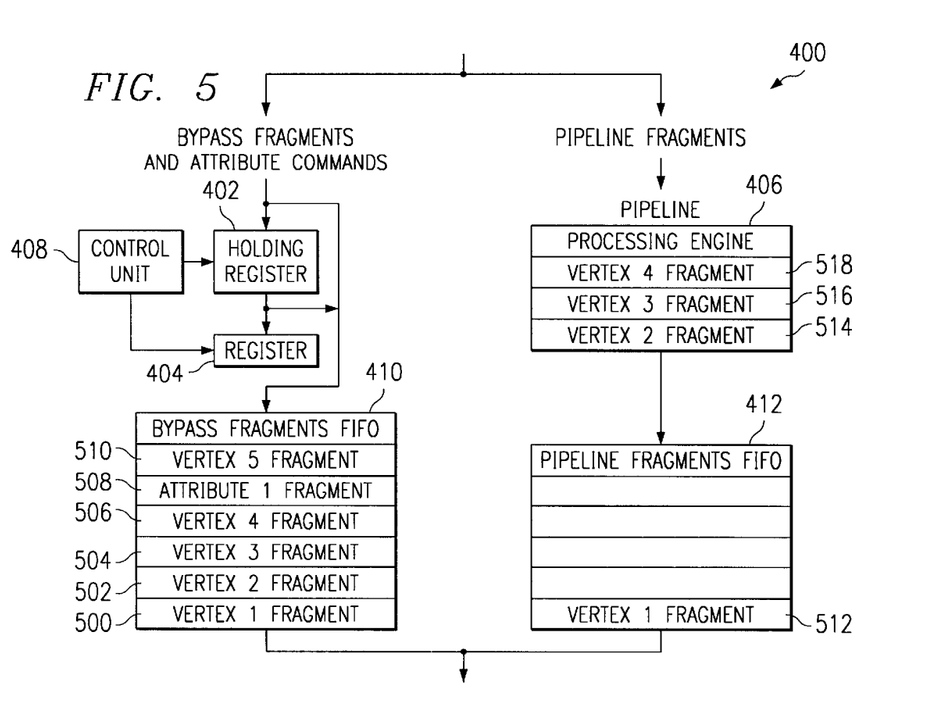
FIG. 5 is a block diagram of graphics data in a stage in accordance with a preferred embodiment of the present invention.

Turning now to FIG. 5, a block diagram of graphics data in a stage is depicted in accordance with a preferred embodiment with the present invention. In this example, vertex 1, vertex 2, vertex 3, vertex 4, and vertex 5 are vertices received by stage 400. Fragments within these vertices are split up within stage 400 between fragments that are to be processed by the stage and those that are to be passed on without any processing or modification. Vertex 1 contains vertex 1 fragment 500 and vertex 1 fragment 512, vertex 2 contains vertex 2 fragment 502 and vertex 2 fragment 514, vertex 3 contains vertex 3 fragment 504 and vertex 3 fragment 516, and vertex 4 contains vertex 4 fragment 506 and vertex 4 fragment 518.

The fragments processed by processing engine 406 are received at the same time that the fragments placed in bypass fragments FIFO 410 are received. When vertex 1 is received, it is split up into vertex 1 fragment 500 and vertex 1 fragment 512 for processing within stage 400.

Vertex 1 fragment 500, vertex 2 fragment 502, vertex 3 fragment 504, and vertex 4 fragment 506 are bypass fragments for four different vertices, vertices 1–4, passing through stage 400. These fragments are placed into bypass fragments FIFO 410 in the order that the vertices are received at stage 400.

Next, attribute 1 508 is received. Attribute 1 508 is examined by control unit 408 and identified as an attribute that does not affect the state of stage 400. This attribute is placed into bypass fragment FIFO 410. Vertex 5 fragment 510 is then received and is a bypass fragments which is placed into bypass fragments FIFO 410 after attribute 1 508.

Vertex 1 fragment 512 in pipeline fragments FIFO 412 is a fragment associated with vertex 1. This fragment is a pipeline fragment processed by processing engine 406 and is placed into pipeline fragments FIFO 412. Vertex 2 fragment 514, vertex 3 fragment 516, and vertex 4 fragment 518 are vertices currently being processed within processing engine 406.

In this instance, all of the fragments for vertex 1 are "valid", which means that all of the fragments for vertex 1 are ready to be passed to the next stage. Additionally, stage 400 is also ready to receive additional fragments for other vertices for processing.

Figure 6:
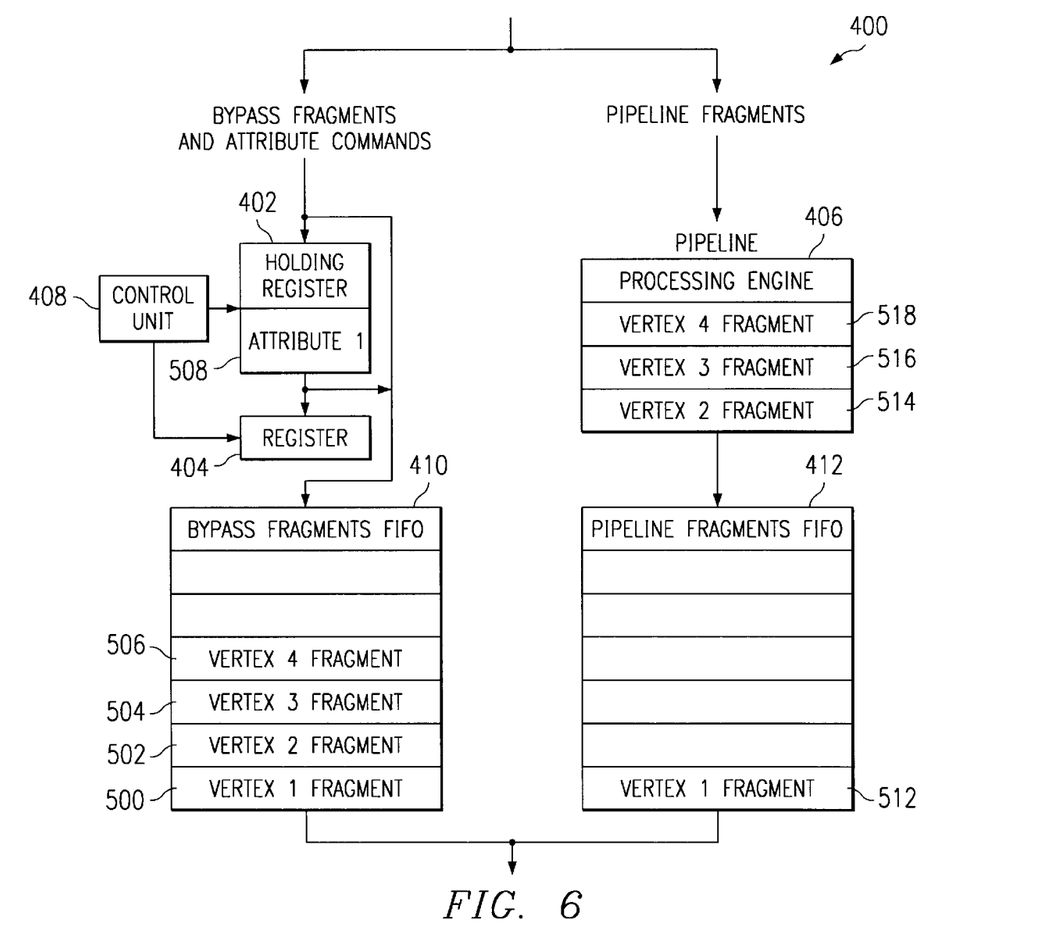
FIG. 6 is a block diagram of graphics data in a stage in accordance with a preferred embodiment with the present invention.

Turning now to FIG. 6, a block diagram of graphics data in a stage is depicted in accordance with a preferred embodiment with the present invention. In this example, the same fragments received in FIG. 5 are illustrated here in FIG. 6. Again, vertex 1 fragment 500, vertex 2 fragment 502, vertex 3 fragment 504, and vertex 4 fragment 506 are received and placed into bypass fragments FIFO 410. In this case, however, attribute 1 508 is received and identified as affecting the state of stage 400. As a result, attribute 1 508 is not bypassed into fragments FIFO 410. Instead, attribute 1 508 is placed into holding register 402.

Attribute 1 508 is held in holding register 402 until vertex 2 fragment 514, vertex 3 fragment 516, and vertex 4, 518 are processed by processing engine 406 and placed into pipeline fragments FIFO 412. When these fragments are processed and placed into pipeline fragments 412, attribute 1 508 is then placed into register 404 for processing of additional fragments that are received by stage 400. Additionally, until the fragments for vertices being processed by processing engine 406 are finished and placed into pipeline fragments FIFO 412, stage 400 generates a not ready signal for a previous or prior stage to stage 400. In this case, additional vertices will not be received by stage 400. Once the fragments have been placed into pipeline fragments FIFO 412, the signal is then changed to a ready signal to indicate stage 400 is ready to receive additional vertices for processing.

Figure 7:
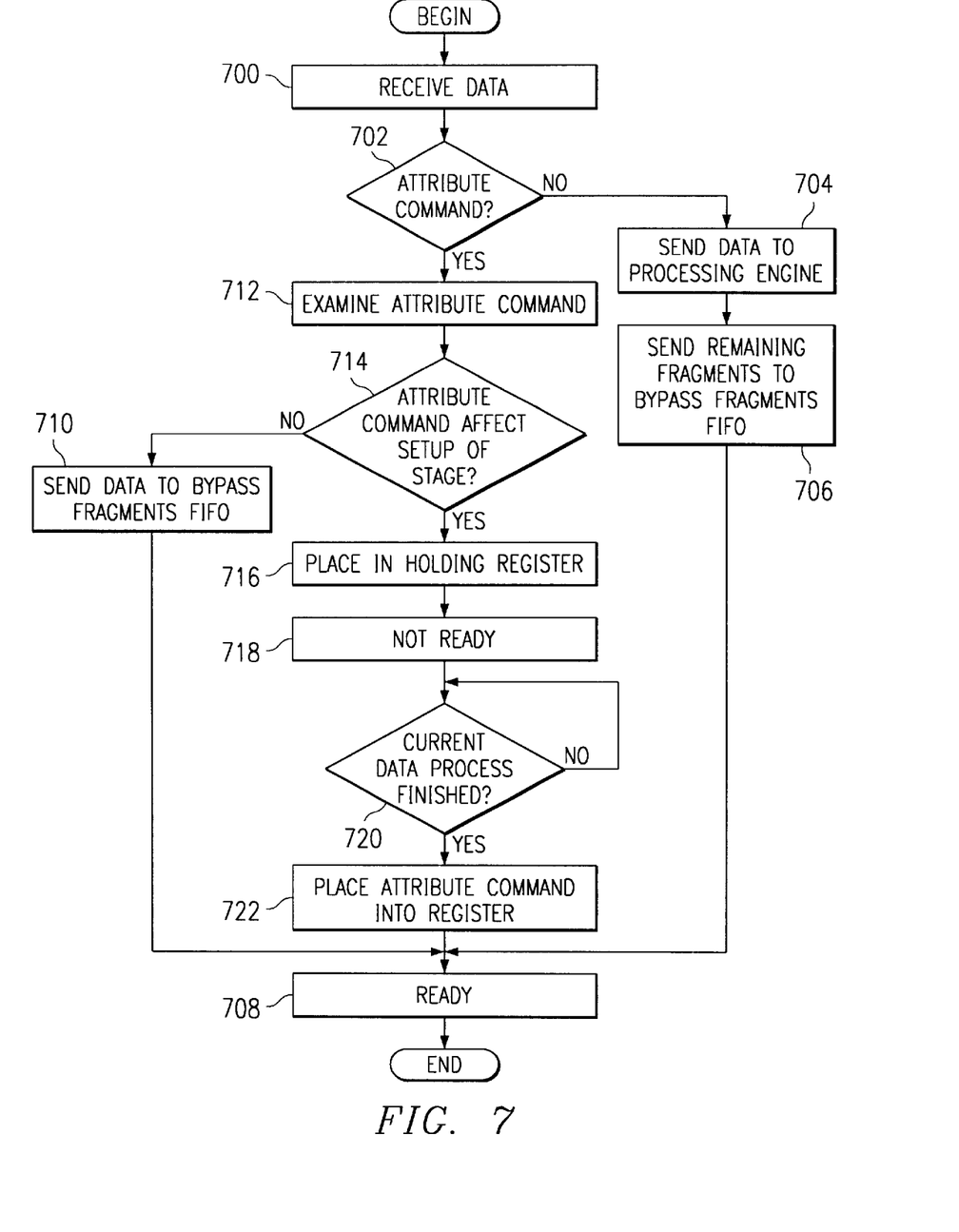
FIG. 7 is a flowchart of a process for processing attribute commands in a stage in accordance with a preferred embodiment of the present invention.

With reference now to FIG. 7, a flowchart of a process for processing attribute commands in a stage is depicted in accordance with a preferred embodiment of the present invention. The process illustrated in FIG. 7 is implemented in a control mechanism, such as control unit 408 in stage 400 in FIG. 4.

The process begins by receiving data (step 700). This data may take various forms, such as a vertex or an attribute command. A determination is made as to whether the data is an attribute command (step 702). If the data is not an attribute command data, then the appropriate fragment data is sent to a processing engine, such as processing engine 400 in FIG. 4, for processing (step 704). The remaining fragments are sent to the bypass fragments FIFO, such as bypass fragments FIFO 410 in FIG. 4 (step 706). The process then proceeds to generate a ready signal (step 708) with the process terminating thereafter. This ready signal indicates that the stage is ready to accept additional fragments for processing.

Turning back to step 702, if the data received by the stage is an attributes command, the attribute command is examined (step 712). In this example, the attribute command contains an opcode, which is examined to identify whether the attribute command affects the stage. A determination is made as to whether the command affects the stage based on the examination of the attribute command (step 714). If the attribute command does not affect the stage, then the process proceeds to send the data to the bypass fragments FIFO (step 710).

If the attribute command does affect the state of the stage, then the attribute command is placed into a holding register (step 716). Additionally, a not ready signal is generated to indicate that the stage is unable or not ready to accept additional data for processing from a prior stage (step 718). A determination is then made as to whether data received for processing within the stage has been processed (step 720). If fragments are still being processed, the process returns to step 720. Upon a determination that processing of data in the stage has completed, the attribute command is then placed into another register, such as register 404 in FIG. 4, for use by the processing engine in changing the state or setup of the stage for any new vertices received by the stage (step 722). The process then proceeds to step 708 to generate a ready signal as described above.

In this manner, the mechanism of the present invention provides for selectively processing attribute commands in a manner to minimize degradation in performance when multiple vertices are processed concurrently within a stage or processing element.

Figure 8:
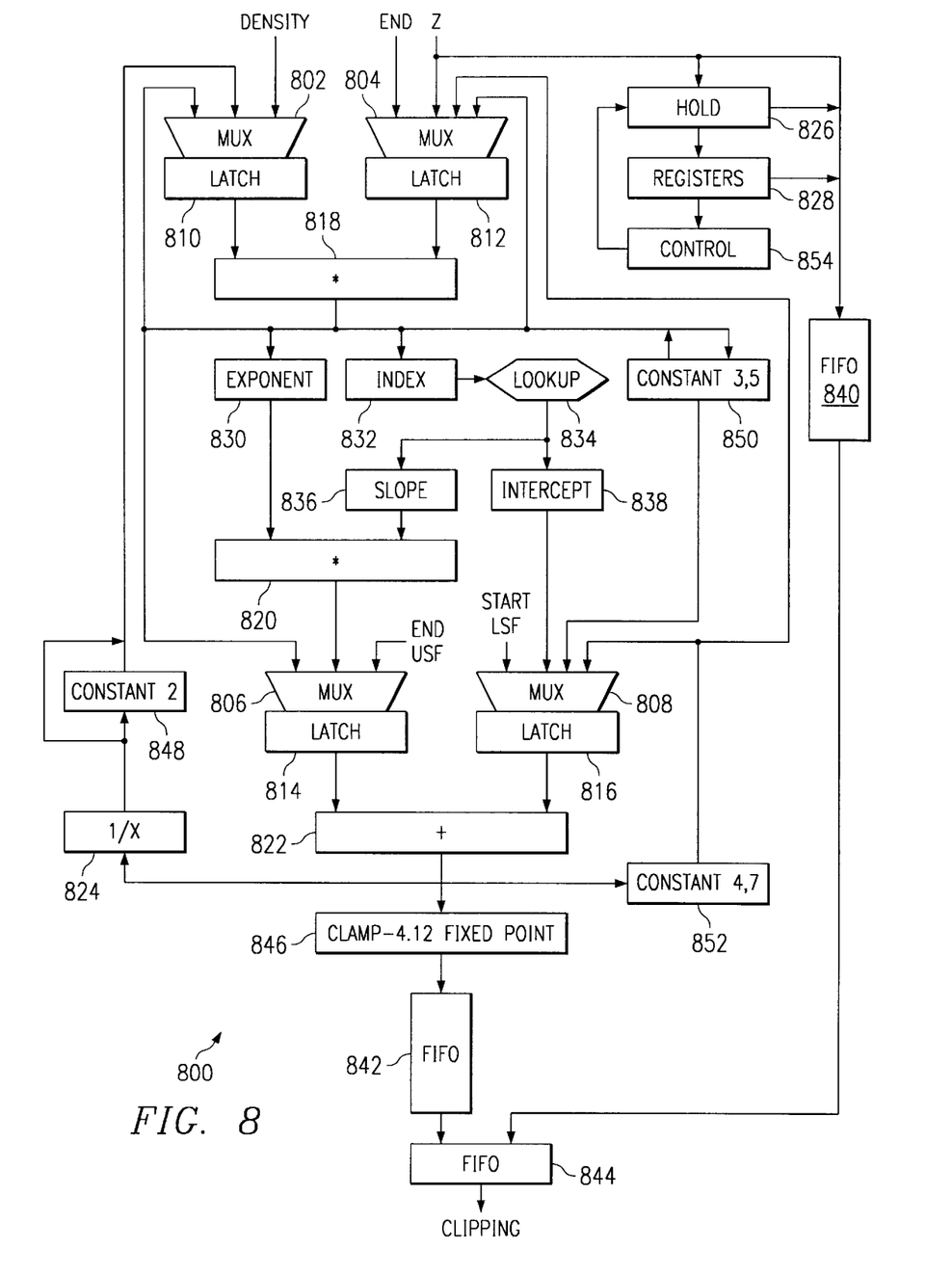
FIG. 8 is a logic diagram of a fog factor generation unit in accordance with a preferred embodiment of the present invention.

With reference next to FIG. 8, a logic diagram of a fog factor generation unit is depicted in accordance with a preferred embodiment of the present invention. Fog factor generation unit 800 is an example implementation of fog factor generation unit 322 in FIG. 3. The mechanism of the present invention used to selectively process attributes is implemented within fog factor generation unit 800 in this example. Fog factor generation unit 800 includes multiplexers 802, 804, 806, and 808 to receive and select data for fog operations. Latches 810, 812, 814, and 816 are used to hold the data received by the multiplexers. Multiplexer 802 is configured to receive a value for the variable density, as well as values generated from other components within fog factor generation unit 800. Multiplexer 804 is configured to receive values for the variables End and Z, as well as values from other components within fog factor generation unit 800. Multiplexer 806 is configured to receive values for the variables End and upper scale factor (USF), as well as values from other components within fog factor generation unit 800. Multiplexer 808 is configured to receive values for the variables Start and lower scale factor (LSF), as well as values from other components within fog factor generation unit 800.

Fog factor generation unit 800 includes a multiplication unit 818, multiplication unit 820, addition unit 822, and reciprocal unit 824. Multiplication units 818 and 820 are used to multiply values input into these units. Addition unit 822 adds values, while reciprocal unit 824 generates the reciprocal of a value input into this unit. Hold unit 826 is used to hold values prior to the values being placed into registers 828. Hold register 826 may receive new values for another fog operation and hold those values until the current operation using values in register 828 has been completed. In these examples, registers 828 are used to hold values.

Exponent unit 830 is used to hold an exponent, which, in this example, is generated through the input of a density value and a Z value into multiplexers 802 and 804, respectively. In these examples, the density is the fog density and is equal to or greater than 0. These values are multiplied to form an exponent held by exponent unit 830. Index unit 832 calculates an index into lookup unit 834 based on the value generated by multiplication unit 818 receiving the values for density and Z. In these examples, Z is received as an absolute value by multiplication unit 818. The absolute value may be obtained as part of a function provided by multiplexer 804. The result of calculating an index into lookup unit 834 provides a slope 836 and an intercept 838. These values are used in fog calculations depending on the particular mode of operation present in fog factor generation unit 800.

Next, first-in-first-out (FIFO) units 840, 842, and 844 are used to hold data prior to the data being sent to the next processing element, such as clipping unit 320 in FIG. 3. Clamp unit 846 receives the fog factor generated in fog factor generation unit 800 and cuts off the result to provide a signed 16 bit value prior to the factor being output. In this example, the clamp is a 4.12 fixed point clamp in which one signed bit, three integer bits, and twelve decimal bits are present. Constant unit 848 is used to hold constant2, constant unit 850 is used to hold constant3 and constant5, and constant unit 852 is used to hold constant4 and constant7.

In this example, Hold Register 826 corresponds to hold register 402 in FIG. 4, registers 828 includes register 404 in FIG. 4, FIFO 840 corresponds to bypass FIFO 810 in FIG. 8, FIFO 842 corresponds to pipeline fragments FIFO 412 in FIG. 4, and control unit 854 corresponds to control unit 408 in FIG. 4. The other portions of fog factor generation unit 800 are components, which may be used to implement processing engine 404 in FIG. 4.

Fog factor generation unit 800 is an example implementation of the mechanism of the present invention in a particular stage or processing element in a pipeline. The principles of the present invention illustrated in FIG. 8 may be applied to other types of stages or processing elements in a pipeline.

Thus, the present invention provides an improved method and apparatus for processing attribute commands in stages in which multiple vertices are being processed at the same time within individual stages or processing elements. By passing attribute commands, which do not affect the current stage, for transfer to another stage, the mechanism of the present invention reduces performance degradation. By passing on the attribute in this instance, time spent finishing processing fragments for vertices and placing the stage in a not ready state is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. For example, the processes implemented in the control unit may be in the form of processor implemented instructions executed by a processor. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although specific arrangements of registers and FIFOs are provided, these examples are no way meant to be limiting as to how the mechanism of the present invention may be implemented. Other functional components and other arrangements of components process attribute commands following the processes illustrated above. Although the examples illustrated handling of attributes, the mechanism of the present invention can be applied to anything that affects the state of processing within a processing element.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system that includes a graphics adapter that is coupled to a processor, said graphics adapter processing graphics data serially through a graphics pipeline, said graphics pipeline comprising:

an input, wherein the input receives graphics data;

an output, wherein the output transmits processed graphics data; and a plurality of stages, wherein a first stage within the plurality of stages is connected to the input and a last stage within the plurality of stages is connected to the output, wherein a selected stage within the plurality of stages includes a plurality of modes of operation including:

a first mode of operation, responsive to receiving an attribute command while the selected stage is processing graphics data, in which the selected stage determines whether the attribute command is designated for the selected stage, an attribute command affecting processing of graphics data in a stage for which the attribute command has been designated and not affecting processing of graphics data in stages for which the attribute command has not been designated, the selected stage having received the graphics data for processing prior to the receipt of the attribute command;

a second mode of operation, responsive to a determination that the processing of graphics data in the selected stage is unaffected by the attribute command, in which the selected stage sends the attribute command to a subsequent stage in a serial order, the selected stage continuing processing of the graphics data and remaining ready to receive additional graphics data for processing;

a third mode of operation, responsive to determining that the attribute command affects processing of graphics data within the selected stage, in which the attribute command is held within the stage until all graphics data being processed within the selected stage has completed prior to the selected stage processing the attribute command; and a fourth mode of operation, responsive to a determination that the attribute command affects processing of graphics data by the selected stage, in which the selected stage is prohibited from receiving additional graphics data until the selected stage has finished processing the graphics data and started processing the attribute command.

2. The graphics pipeline of claim 1, wherein the selected stage further includes:

a fifth mode of operation, responsive to a completion of processing of the graphics data, in which the selected stage indicates that the selected stage is again ready to accept additional graphics data for processing.

3. The graphics pipeline of claim 1, wherein the selected stage includes a fifth mode of operation, responsive to completion of processing of all graphics data within the selected stage, in which the selected stage alters processing within the selected stage based on the attribute command.

4. The graphics pipeline of claim 1, wherein the selected stage is one of normal/model view transformation unit, a normalize unit, a texture coordinate generation unit, a lighting unit, a texture/projection transformation unit, a clipping unit, a fog factor generation unit, a perspective divide unit, and a viewport transformation unit.

5. The graphics pipeline of claim 1, wherein the command is held in a storage.

6. The graphics pipeline of claim 1, wherein the command is sent to a subsequent stage by placing the command in a first-in-first-out memory.

7. A method in a data processing system that includes a graphics adapter that is coupled to a processor, said graphics adapter processing graphics data serially through a plurality of stages of a graphics pipline, the method comprising:

receiving graphics data within a selected stage for processing;

receiving an attribute command in the selected stage after the receipt of the graphics data;

determining by the selected stage whether the attribute command affects processing of the graphics data that is currently within the selected stage, an attribute command affecting processing of graphics data in a stage for which the attribute command bas been designated and not affecting processing of graphics data in stages for which the attribute command has not been designated;

sending, by the selected stage, the attribute command to a subsequent stage if the attribute command does not affect processing of graphics data in the selected stage, the selected stage continuing processing of the graphics data and remaining ready to receive additional graphics data for processing;

holding the attribute command within the selected stage if the attribute command affects processing of the current graphics data within the selected stage until processing of the current graphics data has completed; and in response to a determination that the attribute command affects processing graphics data by the selected stage, prohibiting, by the selected stage, receipt of additional graphics data until the selected stage has finished processing the graphics data and started processing the attribute command.

8. The method of claim 7, further comprising:

in response to a completion of processing of the graphics data, indicating, by the selected stage, that the selected stage is again ready to accept additional graphics data for processing.

9. The method of claim 7, further comprising:

receiving additional graphics data within the selected stage after the selected stage has completed processing of the current graphics data; and processing the additional graphics data using the attribute command.

10. A data processing system that includes a graphics adapter that is coupled to a processor, said graphics adapter for processing graphics data serially through a plurality of stages of a graphics pipeline, comprising:

receiving means for receiving graphics data within a selected stage for processing;

receiving means for receiving an attribute command in a selected stage after the receipt of the graphics data;

determining means for determining within the selected stage whether the attribute command affects the processing of graphics data that is currently within the selected stage, an attribute command affecting processing of graphics data in a stage for which the attribute command has been designated and not affecting processing of graphics data in stages for which the attribute command has not been designated;

sending means for sending by the selected stage the attribute command to a subsequent stage if the attribute command does not affect processing of graphics data in the selected stage, the selected stage continuing processing of the graphics data and remaining ready to receive additional graphics data for processing;

holding means for holding the attribute command within the selected stage if the attribute command affects processing of the current graphics data within the selected stage until processing of the current graphics data has completed:

prohibiting means for prohibiting by the selected stage, in response to a determination that the attribute command affects processing of graphics data by the selected stage, receipt of additional graphics data until the selected stage has finished processing the graphics data and started processing the attribute command.

11. The processing element of claim 10, further comprising:

in response to a completion of processing of the graphics data, indicating means for indicating, by the selected stage, that the selected stage is again ready to accept additional graphics data for processing.

12. The processing element of claim 10, further receiving means for receiving additional graphics data within the selected stage after the selected stage has completed processing of the current graphics data; and processing means for processing the additional graphics data using the attribute command.

13. A computer program product in a computer readable medium in a data processing system that includes a graphics adapter that is coupled to a processor, said graphics adapter processing graphics data serially through a graphics pipeline, the computer program product comprising:

instructions for receiving graphics data within a selected stage for processing;

instructions for receiving an attribute command in the selected stage after the receipt of the graphics data;

instructions for determining by the selected stage whether the attribute command affects the processing of the graphics data that is currently within the selected stage, an attribute command affecting processing of the graphics data in a stage for which the attribute command has been designated and not affecting the processing of graphics data in stages for which the attribute command has not been designated;

instructions for sending, by the selected stage, the attribute command to a subsequent stage if the attribute command does not affect processing of graphics data in the selected stage, the selected stage continuing processing of the graphics data and remaining ready to receive additional graphics data for processing;

instructions for holding the attribute command within the selected stage if the attribute command affects processing of graphics data within the selected stage, receipt of additional graphics data until the selected stage has finished processing the graphics data and started processing the attribute command.

* * * * *

UNITED STATES PATENT AND TRADEMARK OFFICE
CERTIFICATE OF CORRECTION

PATENT NO. : 6,778,174 B1
DATED : August 17, 2004
INVENTOR(S) : Fox et al.

It is certified that error appears in the above-identified patent and that said Letters Patent is hereby corrected as shown below:

Column 11,
Line 35, after "command" delete "bas" and insert -- has --.
Line 48, after "and" insert new line space.

Column 12,
Line 27, after "completed" delete ":" and insert -- ; --.
Line 40, after "further" insert -- comprising: --.

Column 14,
Line 1, after "of" and before "graphics" insert
-- the current graphics data within the selected stage until processing of the current graphics data has completed; and
   instructions for prohibiting by the selected stage, in response to a determination that the attribute command affects processing of --.

Signed and Sealed this

Eighteenth Day of October, 2005

JON W. DUDAS
*Director of the United States Patent and Trademark Office*